(12) United States Patent
Bechtold et al.

(10) Patent No.: US 9,139,303 B2
(45) Date of Patent: Sep. 22, 2015

(54) PLINTH-MOUNTED SEAT ASSEMBLY AND MOUNTING SUB-ASSEMBLIES

(75) Inventors: Donald Bechtold, Kernersville, NC (US); Timothy E. Fry, Winston-Salem, NC (US); James R. Penley, Pfafftown, NC (US); Gregory Nield, Lexington, NC (US); Marc F. Pearce, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 698 days.

(21) Appl. No.: 13/419,845

(22) Filed: Mar. 14, 2012

(65) Prior Publication Data

US 2012/0235453 A1 Sep. 20, 2012

Related U.S. Application Data

(60) Provisional application No. 61/452,788, filed on Mar. 15, 2011.

(51) Int. Cl.
*A47C 31/00* (2006.01)
*B64D 11/06* (2006.01)
*B61D 33/00* (2006.01)

(52) U.S. Cl.
CPC ........ *B64D 11/0696* (2013.01); *B61D 33/0057* (2013.01)

(58) Field of Classification Search
CPC .................................................. B64D 11/0023
USPC ............. 297/217.1, 217.7; 244/122 R, 118.6; 248/503.1
See application file for complete search history.

(56) References Cited

U.S. PATENT DOCUMENTS

| | | | | | |
|---|---|---|---|---|---|
| 3,381,921 | A | * | 5/1968 | McDonough et al. | 410/79 |
| 3,480,240 | A | * | 11/1969 | Del Giudice | 244/118.6 |
| 4,625,934 | A | * | 12/1986 | Ryan et al. | 244/122 R |
| 5,520,357 | A | * | 5/1996 | Payne et al. | 244/118.1 |
| 5,722,617 | A | * | 3/1998 | Cecinas | 244/122 R |
| 6,068,214 | A | * | 5/2000 | Kook et al. | 244/118.1 |
| 7,029,215 | B2 | * | 4/2006 | Dowty | 410/105 |
| 7,523,888 | B2 | * | 4/2009 | Ferry et al. | 244/118.6 |
| 8,066,321 | B2 | * | 11/2011 | Lusk et al. | 296/178 |
| 8,167,244 | B2 | * | 5/2012 | Johnson et al. | 244/118.5 |
| 8,172,195 | B2 | * | 5/2012 | Fanucci et al. | 248/647 |
| 2005/0012363 | A1 | * | 1/2005 | Ferry et al. | 297/62 |
| 2010/0019086 | A1 | | 1/2010 | Ferry et al. | |
| 2010/0252680 | A1 | * | 10/2010 | Porter | 244/118.6 |
| 2012/0025018 | A1 | * | 2/2012 | France et al. | 244/118.6 |
| 2014/0159440 | A1 | * | 6/2014 | Porter | 297/163 |

FOREIGN PATENT DOCUMENTS

GB 1 228 657 A 4/1971
WO WO 2012125692 A1 * 9/2012

OTHER PUBLICATIONS

International Search Report for PCT/US2012/029019 dated Jun. 27, 2012.

* cited by examiner

*Primary Examiner* — Laurie Cranmer
(74) *Attorney, Agent, or Firm* — Shumaker, Loop & Kendrick, LLP

(57) ABSTRACT

A seat mounting assembly including a swingarm configured for attachment to spaced-apart floor tracks, and a plinth having a seat mounted thereon mounted on the swingarm such that the swingarm is configured to deflect in a direction away from the plinth in response to floor deformation. An assembly for mounting a suite-style seat supported on a plinth to spaced floor tracks to isolate the plinth from floor deformation.

16 Claims, 12 Drawing Sheets

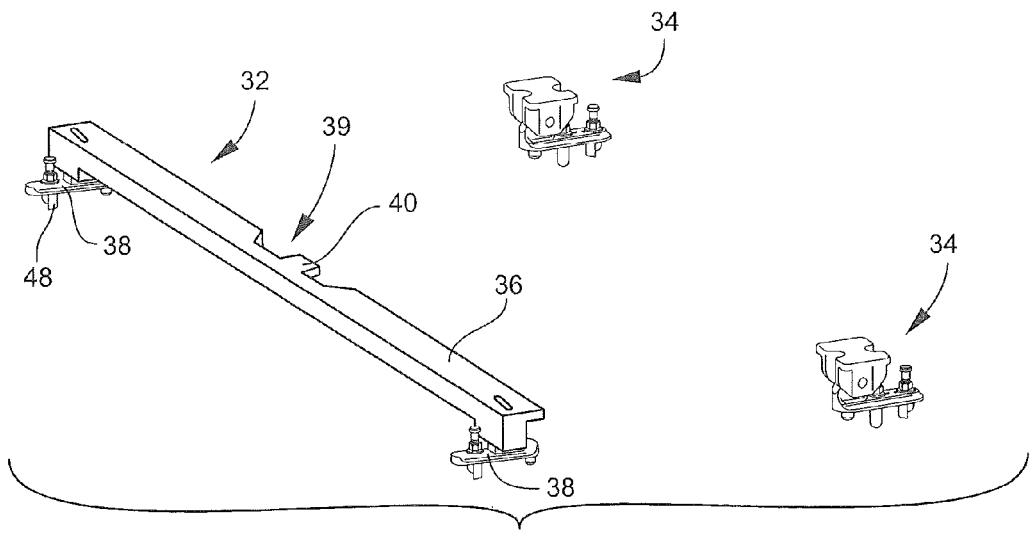
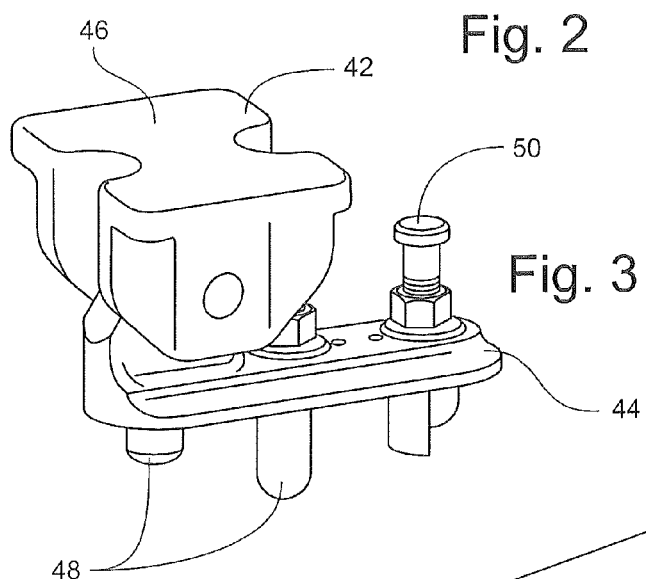
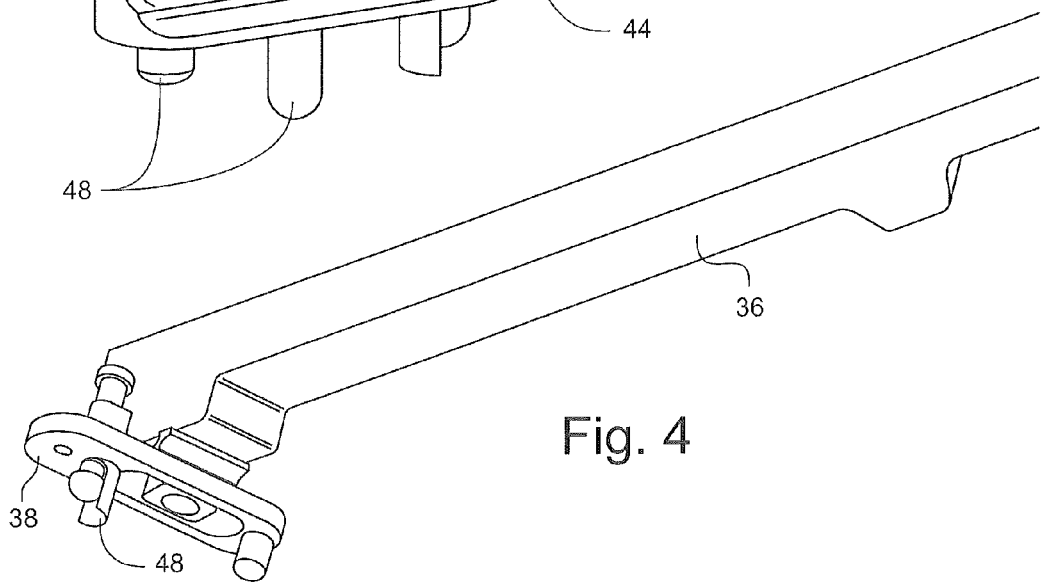

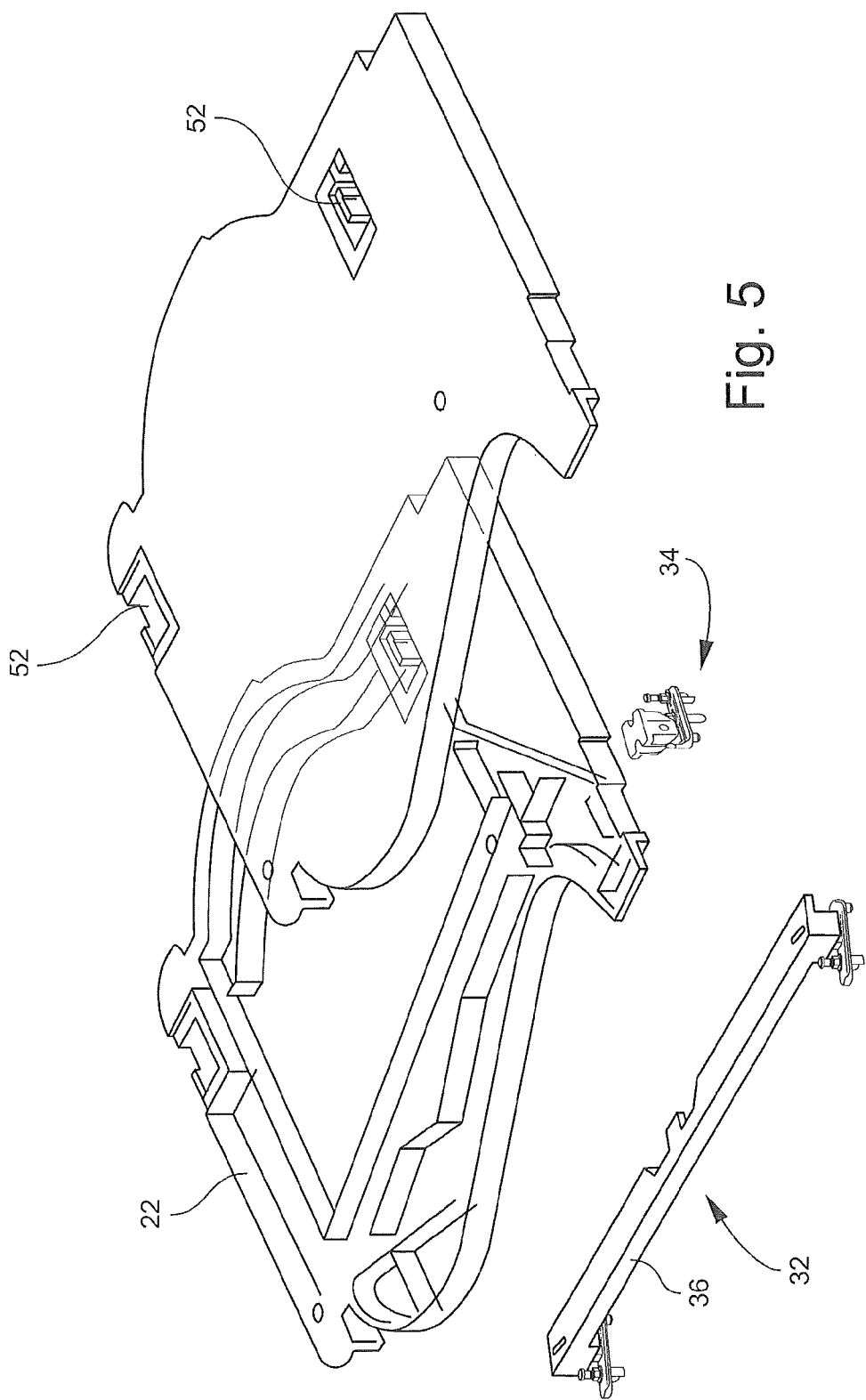

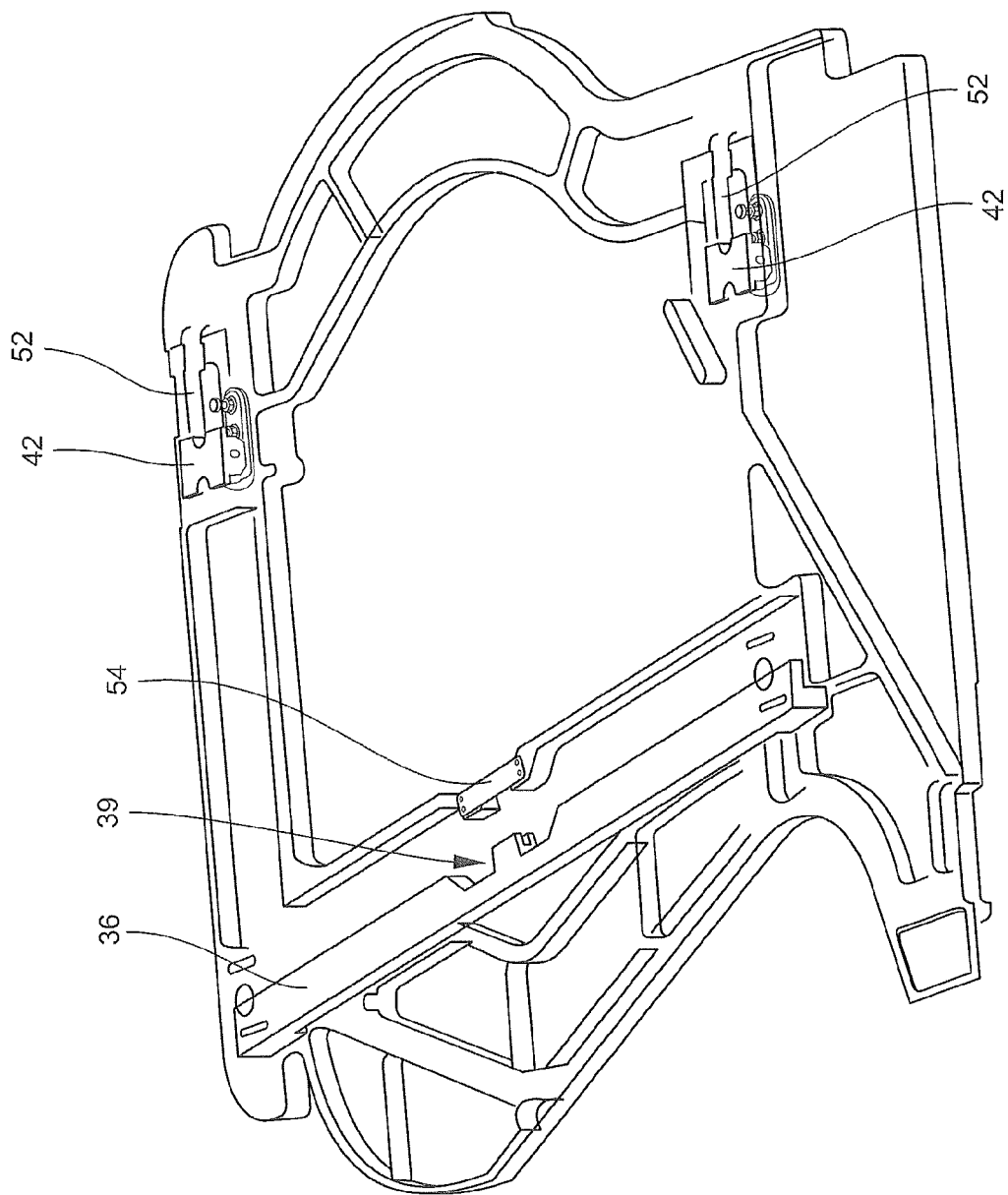

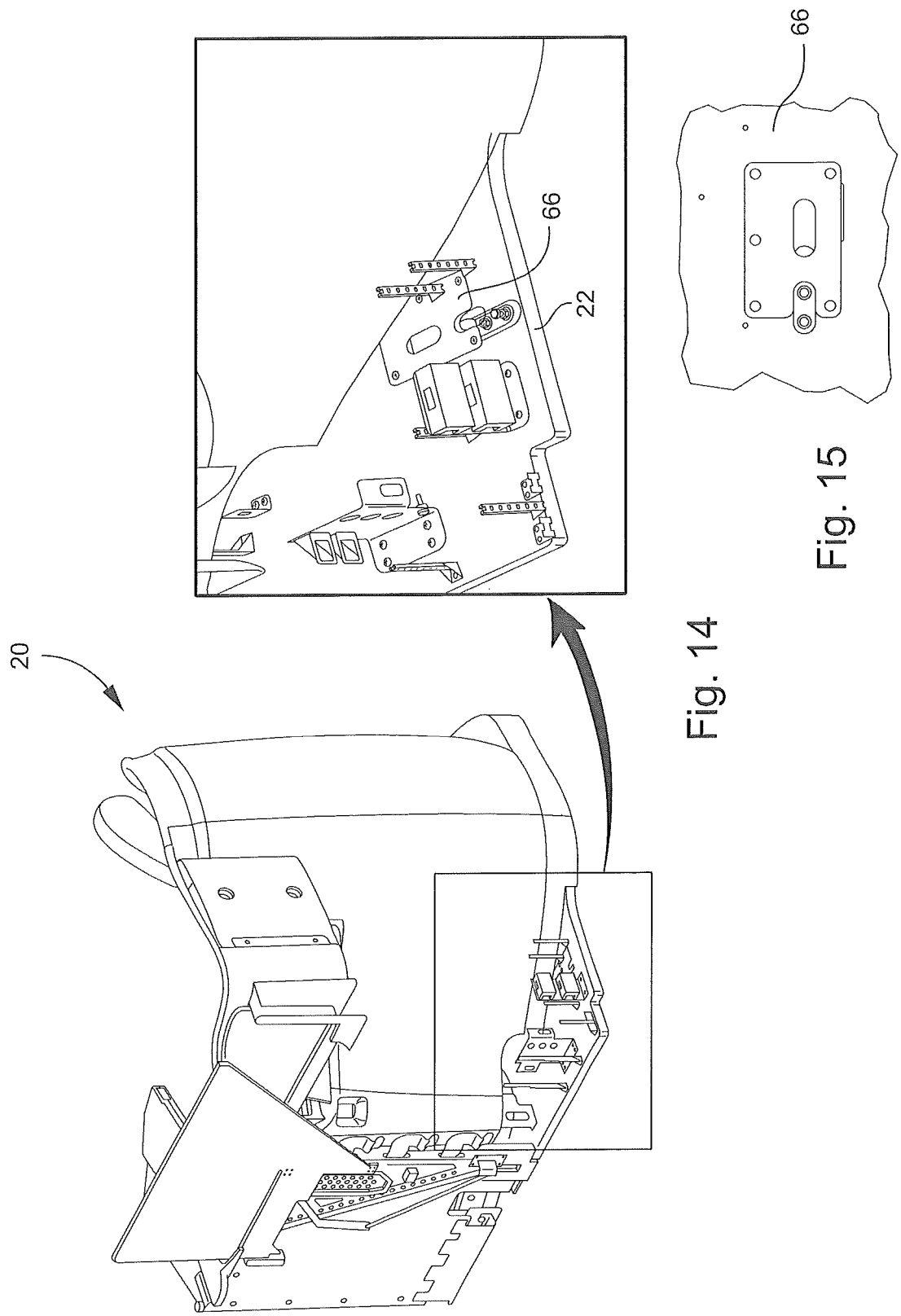

PLINTH-MOUNTED SEAT ASSEMBLY AND MOUNTING SUB-ASSEMBLIES

CROSS-REFERENCE TO RELATED APPLICATION

This application claims priority to U.S. Provisional Application No. 61/452,788 filed Mar. 15, 2011, the contents of which are incorporated by reference herein.

TECHNICAL FIELD AND BACKGROUND OF THE INVENTION

The present invention relates generally to seat assemblies and hardware sub-assemblies for dynamically mounting seat assemblies to floor tracks in an aircraft, and more particularly, to plinth-mounted seat assemblies and mounting sub-assemblies configured to attach seat assemblies to floor tracks to manage floor deformation in a manner that protects the plinth from deformation.

Passenger seats are typically mounted within aircraft using track fittings to secure the legs or other frame members of the seat to the floor tracks. Due to performance requirements of passenger seats during a crash, one of the track fittings or seat frame members is typically designed to absorb forces from the floor to protect the passenger. Common examples of force-absorbing members include deformable track fittings and force-absorbing seat frame members, among others.

While such assemblies are designed to protect the seat from deformation, protection is typically limited to only the seat and not to other furniture located in the vicinity of the seat or the entirety of the passenger's suite. Such assemblies are thus not suitable for use in applications where suite-style seating units are desired, and particularly not for use where a seat, privacy shell, console, etc. are all mounted on the same pallet or "plinth."

Accordingly, what is needed are dynamic assemblies for mounting plinth-mounted seats to an aircraft floor such that entire seat assemblies can be assembled in advance and readily installed onsite, and are isolated from floor deformation.

BRIEF SUMMARY OF THE INVENTION

Accordingly, in one aspect a suite-style seat is provided herein.

In another aspect, a plinth-mounted seat assembly is provided herein.

In yet another aspect, a suite-style seat configured to be assembled in advance and readily installed onsite is provided herein.

In yet another aspect, the seat assembly includes at least a seat and a privacy shell mounted on the same plinth.

In yet another aspect, dynamic sub-assemblies for mounting suite-style seats are provided herein, In yet another aspect, the dynamic sub-assemblies deflect forces away from the plinth in response to deformation of the floor.

In yet another aspect, the plinth is isolated from deformation of the floor.

To achieve the foregoing and other aspects and advantages, in one embodiment a seat mounting assembly is provided herein including a swingarm configured for attachment to spaced-apart floor tracks, and a plinth having a seat mounted thereon mounted on the swingarm such that the swingarm is configured to deflect in a direction away from the plinth in response to floor deformation. The swingarm may be fixed to the spaced-apart floor tracks at its opposing ends and to the plinth at its center such that in operation the swingarm is configured to deflect and move away from the plinth in response to floor deformation without deforming the plinth.

The seat mounting assembly may further include first and second clevis sub-assemblies spaced apart from the swingarm and from each other, the clevis sub-assemblies attaching the plinth to the spaced-apart floor tracks. In one embodiment, each of the first and second clevis sub-assemblies include a clevis having an enlarged head pivotally connected to a track fitting.

The swingarm may engage the plinth at a forward end of the plinth and the clevis sub-assemblies may engage the plinth at rear corners of the plinth. Each of the first and second clevis sub-assemblies may be received within a corresponding opening through the plinth that narrows in a direction of a rear of the plinth such that each clevis sub-assembly slides into locking engagement with the plinth to prevent vertical movement therebetween in an engaged position.

The swingarm may be mounted transverse to the spaced-apart floor tracks or at an angle thereto. The plinth may be mounted on the swingarm centrally along the length of the swingarm such that each end of the swingarm is able to deflect downward away from the plinth. The plinth may slide into locking engagement with the swingarm to allow vertical movement together and prevent vertical movement therebetween in an engaged position.

The swingarm may be pivotally connected at its opposing ends to track fittings.

A privacy shell may also be mounted on the plinth, as well as other furniture and accessories. Attachment points for mounting the seat and the privacy shell to the plinth are preferably concealed from view from above.

According to another embodiment of the invention, an assembly for mounting a suite-style seat supported on a plinth to spaced-apart floor tracks to isolate the plinth from floor deformation is provided herein. The assembly generally includes a swingarm configured to be mounted to spaced-apart floor tracks and engaging the plinth such that the swingarm deflects away from the plinth in response to floor deformation, and clevis sub-assemblies spaced apart from the swingarm and from each other and attaching the plinth to the spaced-apart floor tracks, wherein the swingarm engages the plinth at a forward end of the plinth and the clevis sub-assemblies engage the plinth at rear corners of the plinth.

The swingarm may be fixed to the spaced-apart floor tracks at its opposing ends and to the plinth at its center such that in operation the swingarm is configured to deflect and move away from the plinth in response to floor deformation without deforming the plinth. The plinth may be mounted on the swingarm centrally along the length of the swingarm such that each end of the swingarm is able to deflect downward away from the plinth, and wherein the plinth slides into locking engagement with the swingarm to allow vertical movement together and prevent vertical movement therebetween in an engaged position.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 2 shows an assembly for mounting the seat of FIG. 1 to spaced floor tracks;

FIG. 3 is a detailed view of a clevis sub-assembly;

FIG. 4 is a detailed view of a portion of a swingarm sub-assembly;

FIG. 5 shows plinth installation on the clevis and swingarm sub-assemblies;

FIG. 6 shows the plinth/sub-assembly engagement points;

FIG. 14 is a detailed view of the seat showing viewable attachment points;

FIG. 15 is a detailed view of an attachment point cover plate;

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
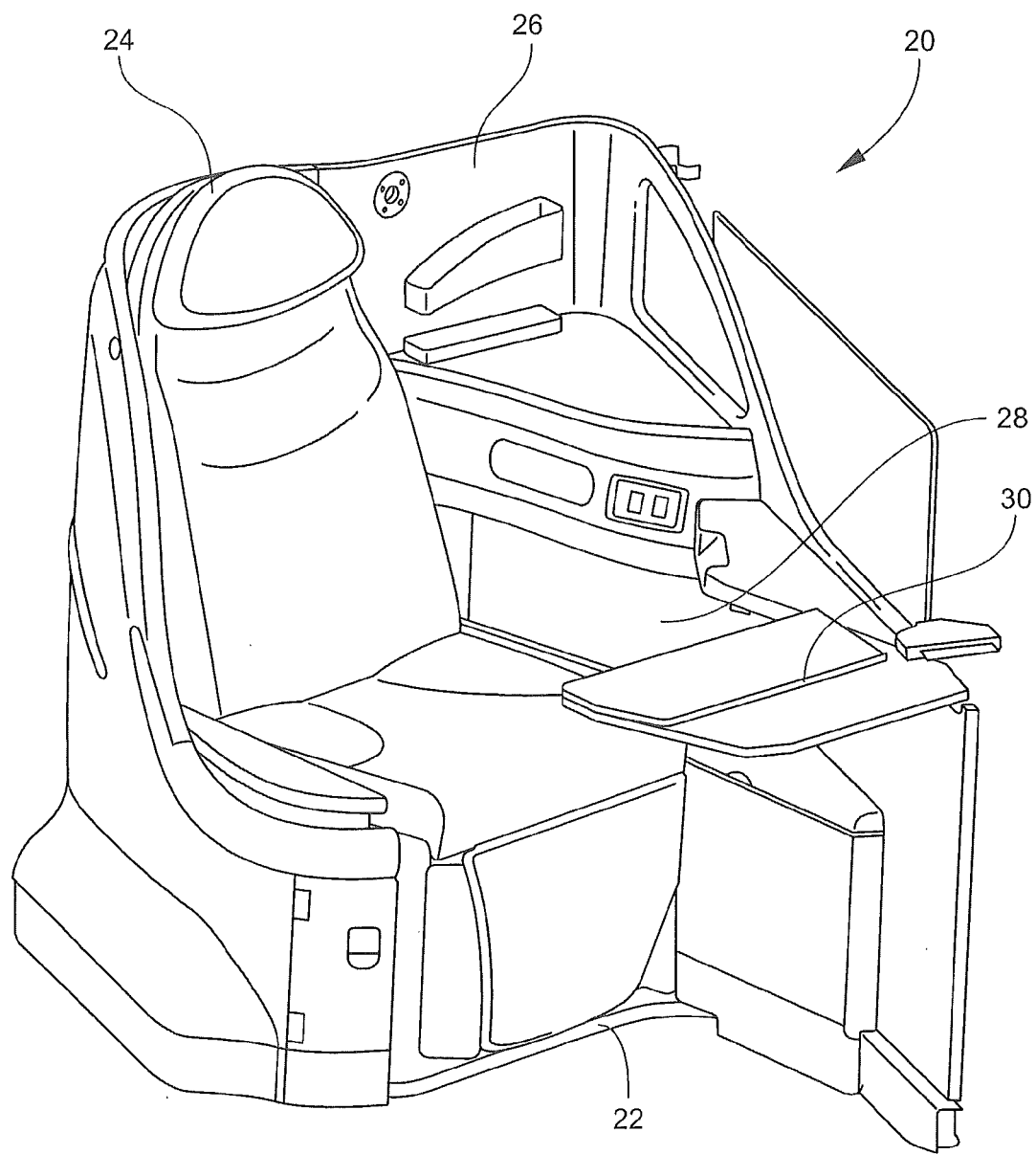
FIG. 1 is a perspective view of a plinth-mounted seat according to an embodiment of the invention.

Referring to the drawings, wherein identical reference numerals denote the same elements throughout the various views, seat assembly 20 illustrated in FIG. 1 generally includes a plinth 22, also referred to herein as a "pallet," supporting a seat 24 thereon, as well as optionally a privacy shell 26, console 28, tray table 30 and other furniture and accessories. The exemplary seat assembly 20 shown is a premium class suite-style seat adapted to be installed as substantially a single unit in an aircraft by readily mounting the entire assembly to existing floor tracks using sub-assemblies described in detail below. As configured, the seat assembly 20 can be mounted to plinth 22 in advance and delivered as a complete seating unit ready to be installed upon associated sub-assemblies. As shown, plinth 22 generally determines the footprint of the seat assembly 20. Plinth 22 and access to attachment points for attaching the seat 24 and other furniture to the plinth are preferably hidden under removable panels and thus concealed from view from above for aesthetic reasons and to prevent tampering.

Referring to FIGS. 2-4, sub-assemblies for installing seat assembly 20 to spaced-apart floor tracks are shown. The sub-assemblies generally include a swingarm 32 that engages about a forward end of seat assembly 20 and clevis sub-assemblies 34 that engage about the rear corners of the seat assembly. Swingarm 32 is an elongate member having track fittings 38 attached to opposing ends thereof for attaching to spaced floor tracks. The swingarm 32 may be mounted either transverse to the spaced-apart floor tracks or at an angle thereto.

Swingarm 132 defines a plinth-engaging portion 39 about centrally located along its length and along one side thereof. As shown, plinth-engaging portion 39 includes at least one projection 40 that extends in the direction toward the rear of the plinth 22 for slidingly engaging the plinth in a manner that prevents allows some vertical movement together but prevents vertical movement therebetween in an engaging position. Because swingarm 32 is fixed to the spaced floor tracks at its opposing ends and to plinth 22 at its center, in operation swingarm 32 deflects and the ends of the swingarm move away from the plinth (e.g. bow) in response to floor deformation and without deforming the plinth. Thus, the seat 24 and other furniture mounted on the plinth 22 are isolated from the floor deformation.

Each clevis sub-assembly 34 includes a clevis 42 connected, for example pivotally connected, to a track fitting 44. Clevis 42 is received within a corresponding opening 52 of plinth 22 that narrows in the direction of the rear of seat assembly 20 such that clevis 42 slides into locking engagement with plinth 22 to prevent vertical movement therebetween in the engaged position. Clevis 42 defines a head 46 that slides over the narrowed portion of the opening in the engaged position to prevent plinth 22 from moving vertically upward with respect to the clevis 42. Clevis 42 and plinth 22 may be locked in the engaged position to prevent lateral motion therebetween.

Figure 7:
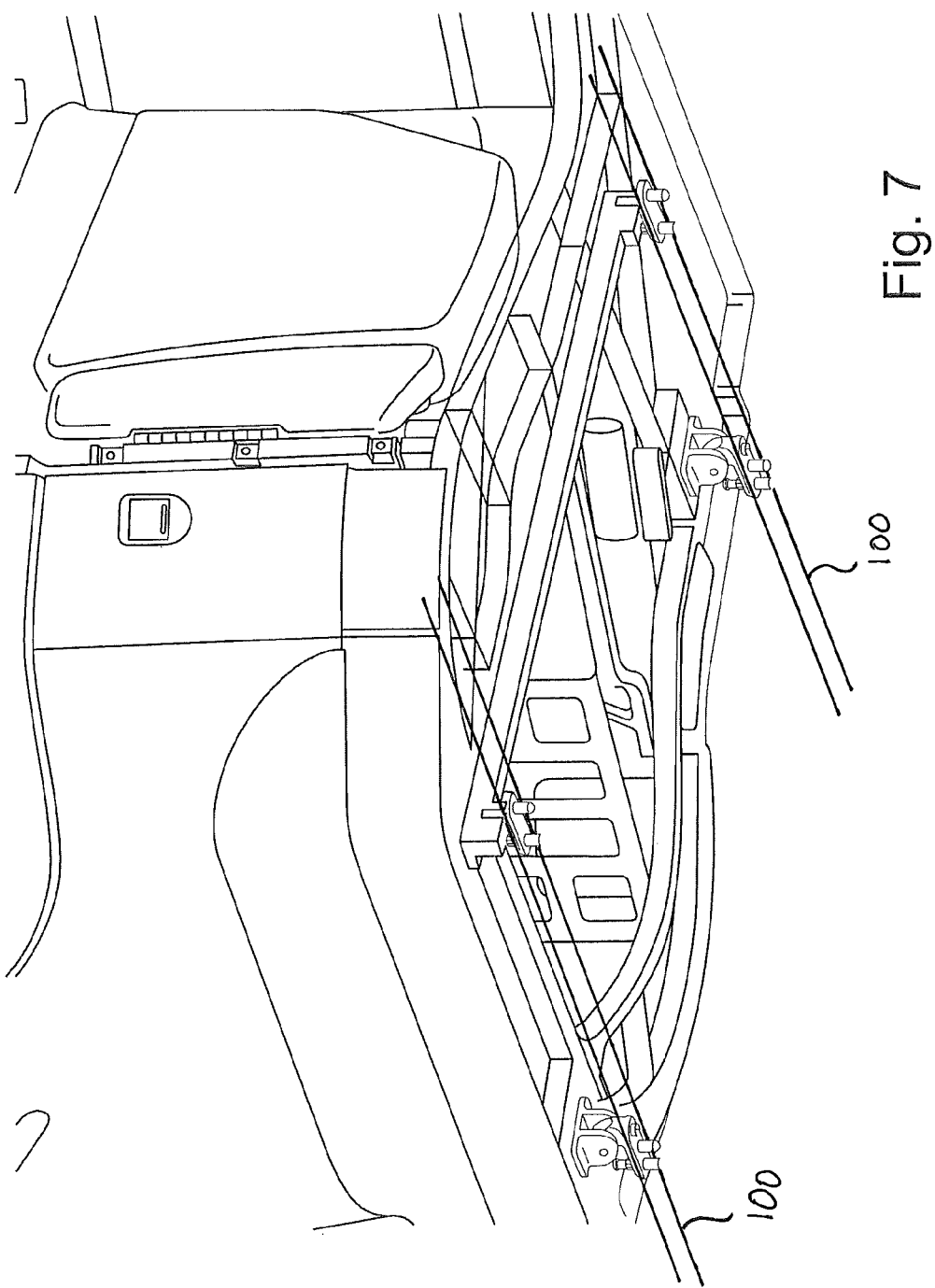
FIG. 7 shows the underside of the plinth to illustrate the plinth/sub-assembly engagement points.

The track fittings 38 and 44 of the sub-assemblies may include spaced-apart downward projections 48 for being received within spaced-apart holes of the floor tracks shown in FIG. 7 at reference numeral 100. The projections 48 can be "tightened" by advancing a fastener 50 through the body of the track fittings to urge the projections against a ramped surface of the fittings to increase the width of the projections to prevent pull-out from the floor track openings.

The swingarm 32 can be pivotally connected at either end to its track fittings 38. In one embodiment, the track fitting 38 and the swingarm 32 attach when their longitudinal axes are aligned and rotate to an angle therebetween to prevent them from being pulled apart. This attachment configuration allows the swingarm 32 to be installed transverse to the floor tracks or at angle thereto, thus providing installation flexibility.

Referring to FIGS. 5-7, plinth 22 installation is achieved by lowering plinth 22 over the installed swingarm 32 and clevis sub-assemblies 34 such that corresponding openings 52 of the plinth 22 align with and receive the sub-assemblies, and the engaging portion of the plinth 22 aligns vertically with but is laterally offset relative to the swingarm. The plinth 22 is locked in engagement with swingarm 32 and the clevis sub-assemblies 34 by sliding the plinth in the direction toward the swingarm such that the plinth-engaging portion 39 of the swingarm 32 engages the swingarm attachment portion 54 of the plinth, and the clevis sub-assemblies 34 engage the narrowed portions of their corresponding openings 52. When the plinth 22 is in the installed or "engaged" position, the plinth is substantially prevented from moving vertically or laterally with respect to the swingarm 32 and the clevis sub-assemblies 34.

Figure 8:
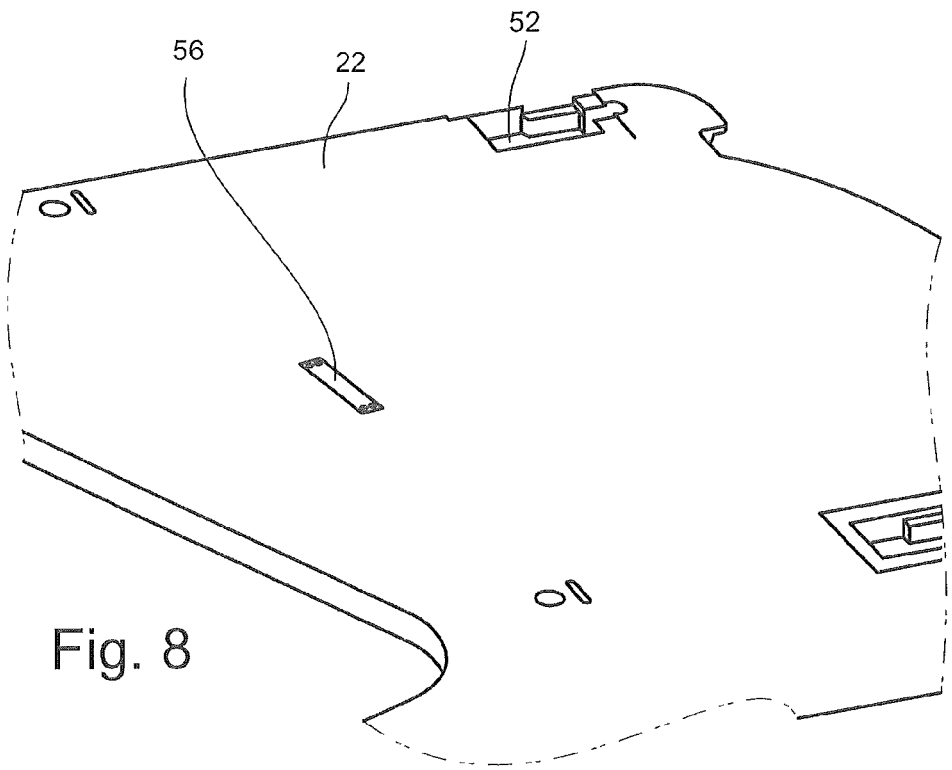
FIG. 8 shows the plinth/sub-assembly engagement points from above.
Figure 9:
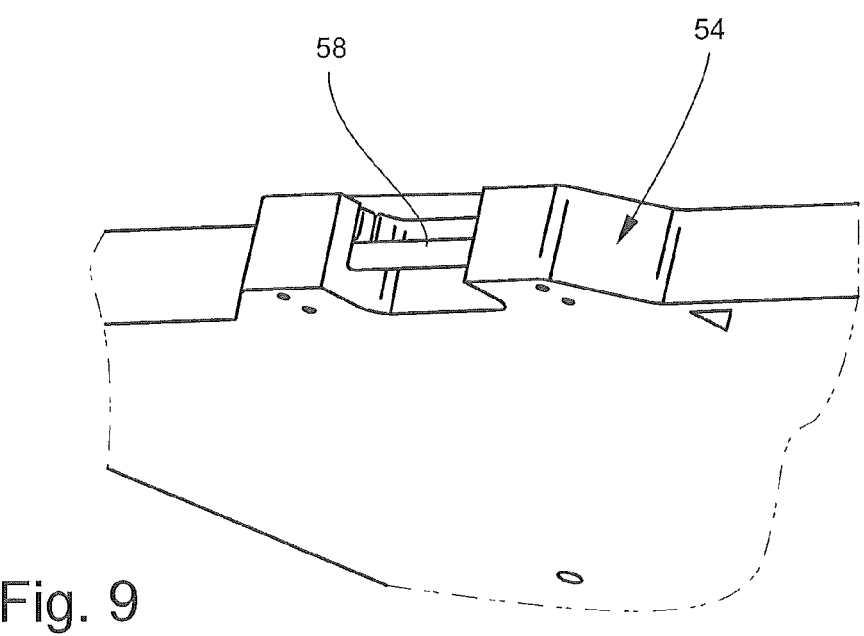
FIG. 9 is a detailed view of the portion of the plinth that engages with the swingarm sub-assembly.
Figure 10:
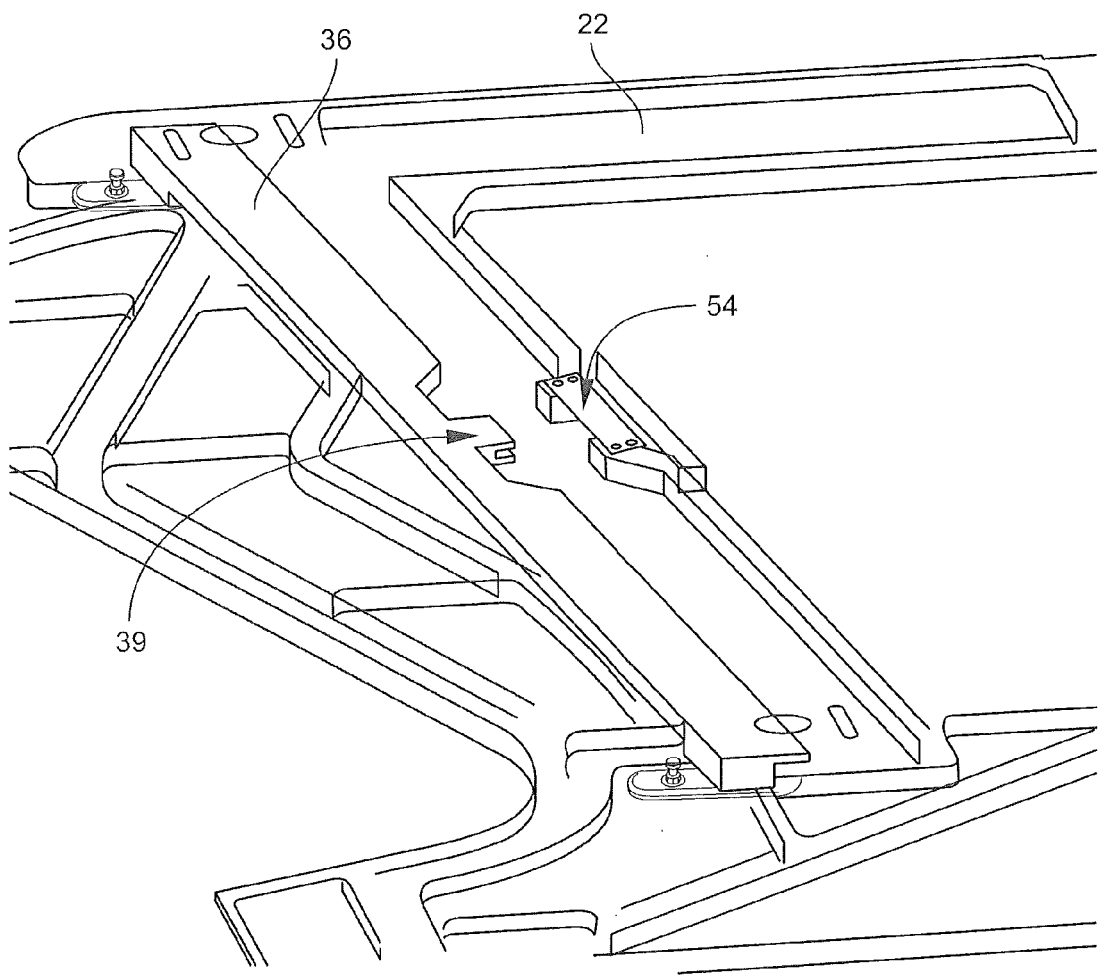
FIG. 10 shows a portion of the underside of the plinth in alignment for engagement with the swingarm sub-assembly.
Figure 11:
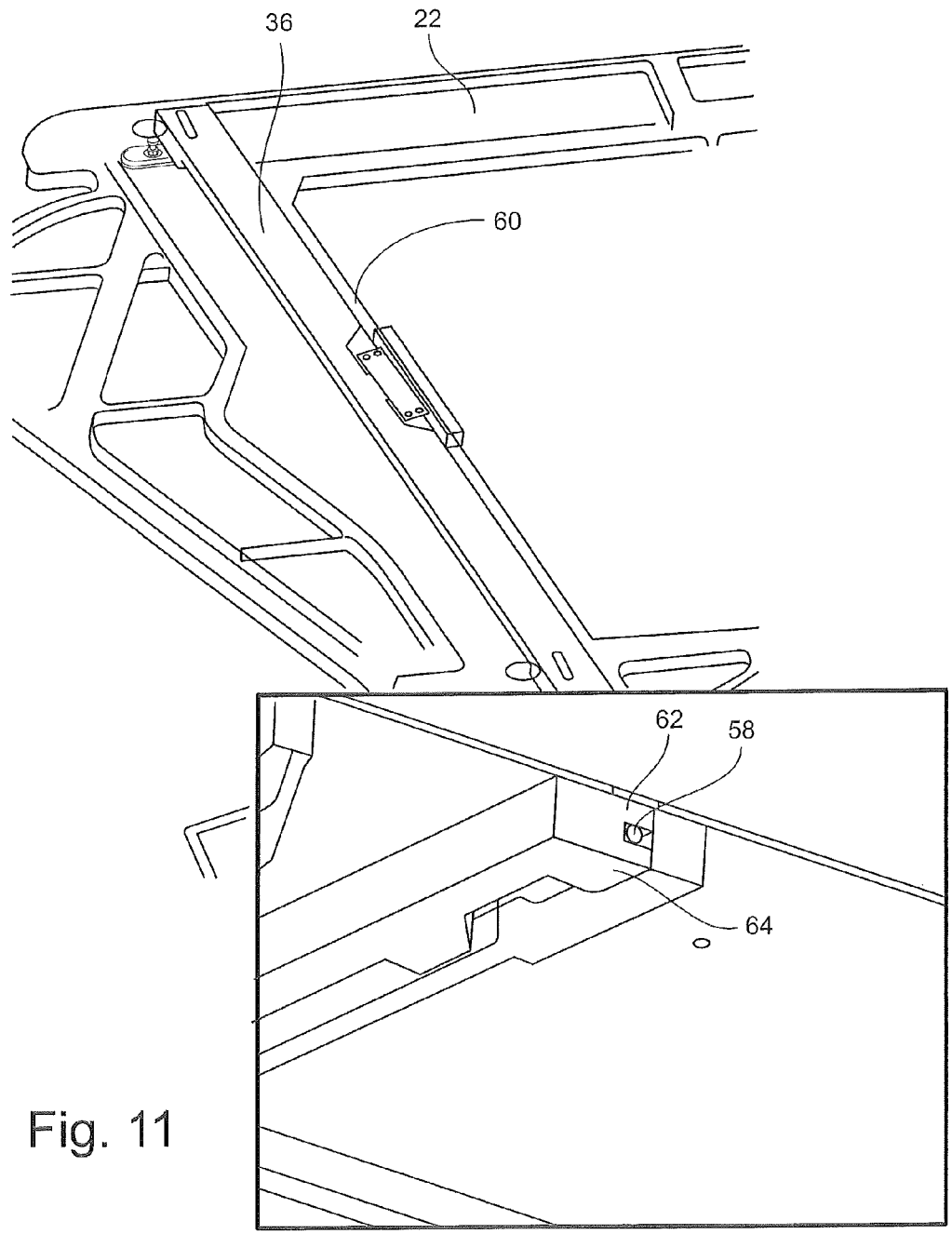
FIG. 11 shows plinth/swingarm engagement.

Referring to FIGS. 8-11, the stages of the plinth 22 installation on swingarm 32 are shown. Referring specifically to FIG. 8, the plinth swingarm attachment area 54 is covered from above by an access cover 56. Referring specifically to FIG. 9, the swingarm attachment area 54 includes a horizontal pin 58 that is engaged by the plinth-engaging portion 39 of the swingarm 32. Referring to FIG. 10, the swingarm 32 and the plinth 22 are shown aligned for engagement but not yet engaged. Referring to FIG. 11, the swingarm 32 and the plinth 22 are shown engaged such that the swingarm 32 seats its rear edge flush against a rib 60 of the plinth 22 to prevent rotational movement therebetween. The pin 58 as shown is received between upper and lower flanges 62 and 64 of the swingarm attachment area 54 when engaged.

Figure 12:
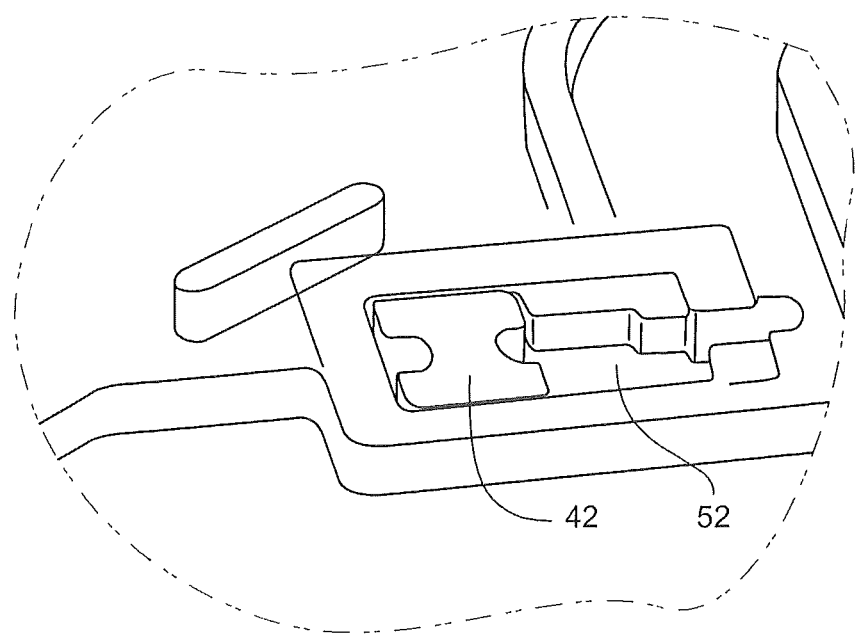
FIG. 12 is a detailed view of a portion of the plinth shown in alignment for engagement with the clevis sub-assembly.
Figure 13:
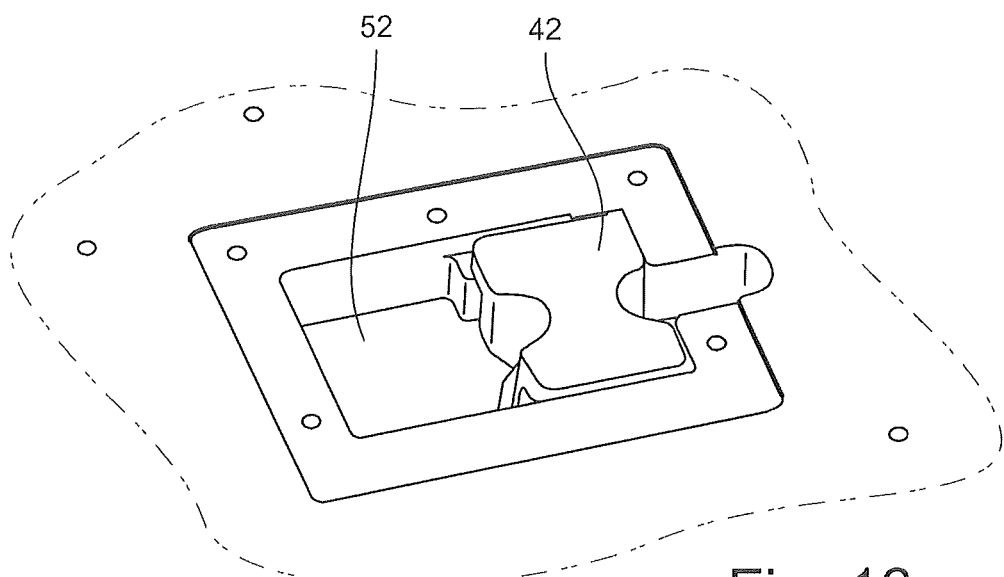
FIG. 13 is a detailed view showing the plinth/clevis sub-assembly engaged.

Referring to FIGS. 12 and 13, stages of the plinth 22 installation on the clevis sub-assemblies 34 are shown. As described above, each clevis 42 is received within a corresponding opening 52 through the plinth 22. Referring specifically to FIG. 12, the clevis 42 is shown received in the opening 52 but not yet engaged. Referring specifically to FIG. 13, the clevis 42 is shown received in and engaged with the narrowed portion of the opening 52. Although not shown, the clevis 42 and the plinth 22 can be locked in engagement by advancing a fastener (e.g. bolt) through the slotted portion of the clevis 42 facing the forward end of the plinth 22. The clevis sub-assembly 34 being engaged with the plinth prevents forward axial movement, and the fastener or bolt prevents aft axial movement.

Figure 16:
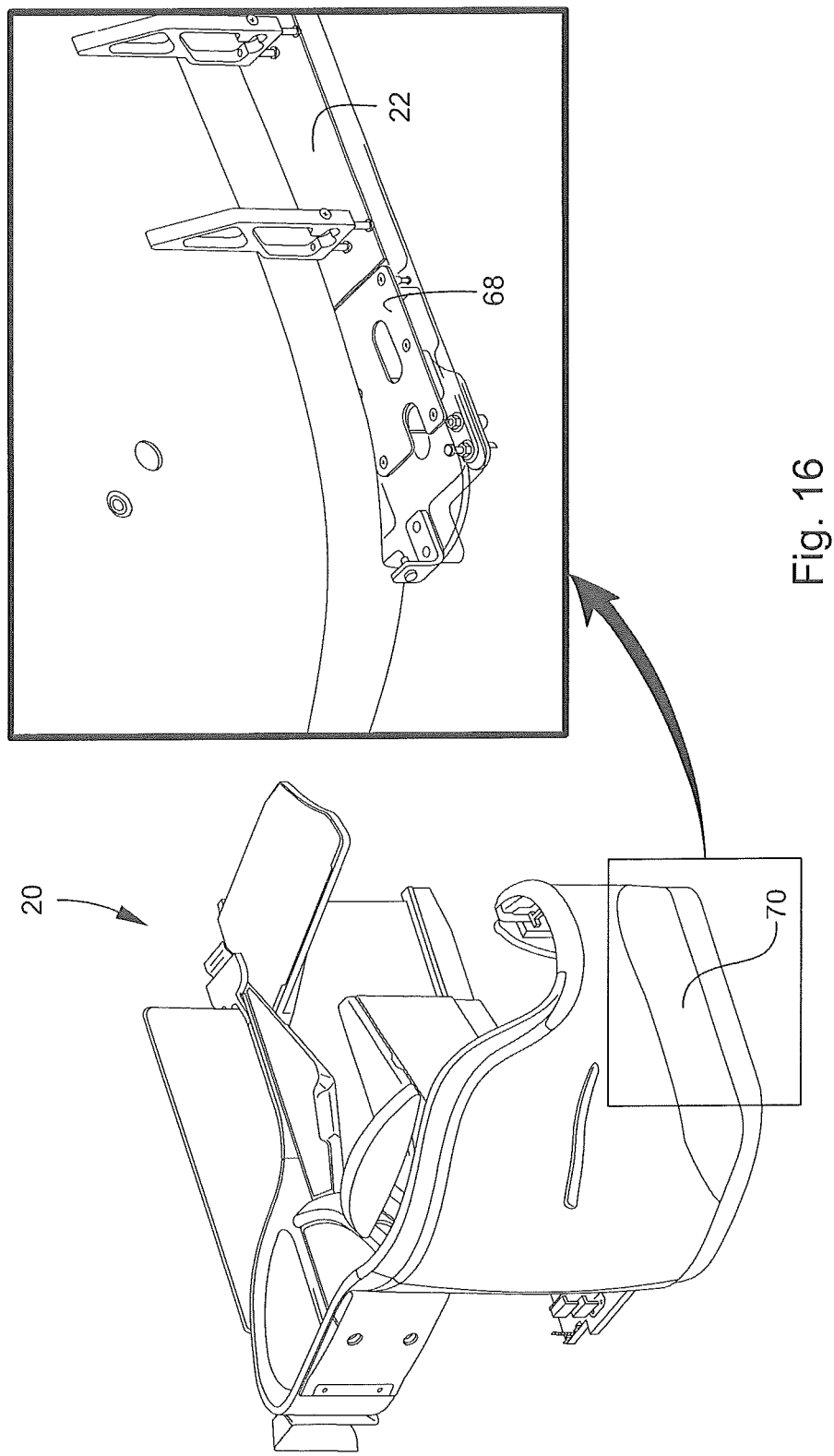
FIG. 16 shows the seat and concealed attachment points.

Referring to FIGS. 14-16, viewable points of attachment between the plinth 22 and the clevis sub-assemblies 34 are shown. Referring specifically to FIGS. 14 and 15, a cover plate 66 is shown in the installed position above the underlying clevis sub-assembly 34. As shown, the plinth 22 includes additional mounting hardware thereon for attaching seat assembly components to the plinth 22. The left rear exposed portion of the plinth 22 shown in FIG. 14 can be covered with a cover to conceal the underlying hardware for aesthetic purposes and to prevent tampering. The cover plate 68 and underlying clevis sub-assembly 34 are preferably located to the outside of the privacy shell 26 to permit access through the cover 70 without disturbing the privacy shell.

Figure 18:
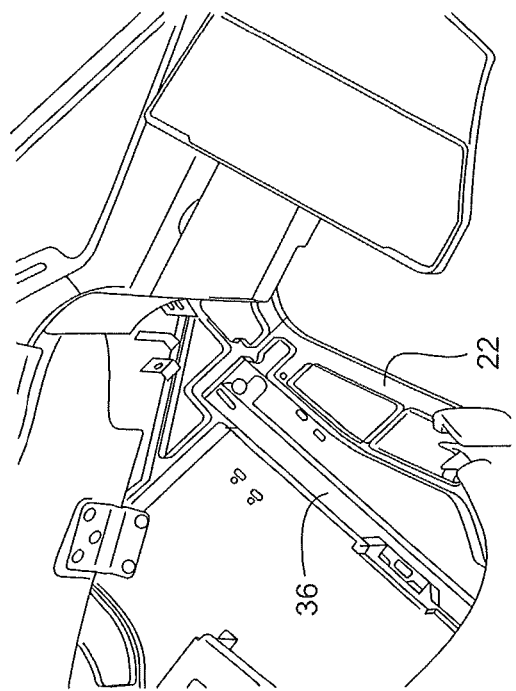
FIG. 18 shows the plinth from above with the seat removed.
Figure 19:
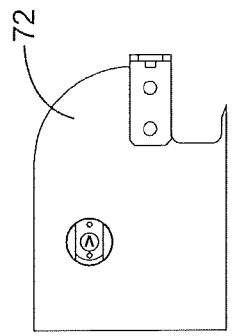
FIG. 19 is a detailed view showing access to fittings.
Figure 17:
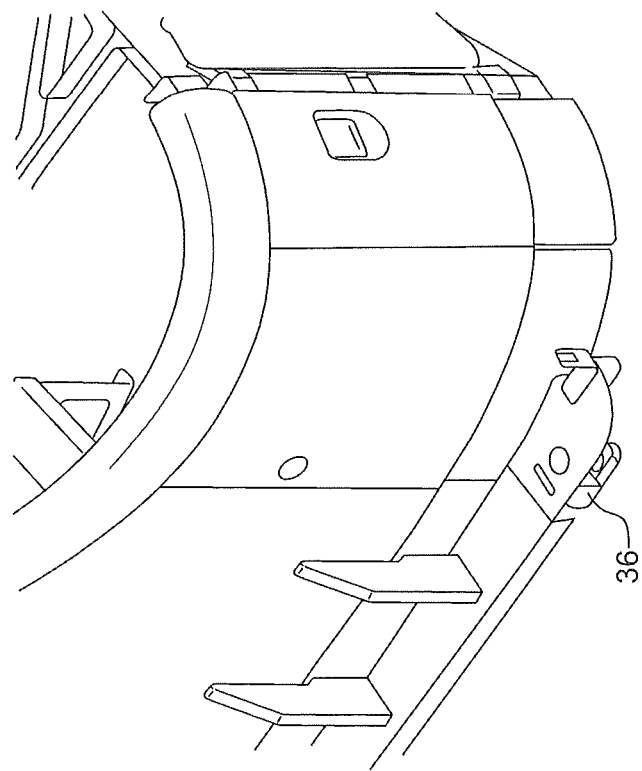
FIG. 17 shows viewable attachment points.

Referring to FIGS. 17-19, the viewable point of attachment between the plinth 22 and the center portion of the swingarm 32 is shown, as well as the points of attachment between the swingarm 32 and the floor tracks. Referring specifically to FIG. 17, right-side attachment of the swingarm 32 to the floor tracks is located to the outside of the privacy shell 26 such that the attachment point can be accessed without disturbing the shell. Access to the attachment point may require some disassembly of seat components in certain seat assembly configurations. Referring specifically to FIG. 18, access to the left-side attachment point with the floor tracks and center attachment point is provided beneath the seat 24 in the seat assembly configuration shown, thus requiring some disassembly of the seat components for access. Referring specifically to FIG. 19, a cover plate 72 for covering access to the underlying fittings is shown.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A seat mounting assembly, comprising:
  a swingarm adapted to mount transverse to spaced-apart floor tracks;
  a plinth having a seat mounted thereon mounted on the swingarm such that the swingarm is configured to deflect in a direction away from the plinth in response to floor deformation; and
  first and second clevis sub-assemblies, spaced apart from the swingarm and from each other, adapted to attach the plinth to the spaced-apart floor tracks, each of the first and second clevis sub-assemblies received within a corresponding opening through the plinth that narrows in a direction of a rear of the plinth such that each clevis sub-assembly slides into locking engagement with the plinth to prevent vertical movement therebetween in an engaged position.

2. The seat mounting assembly according to claim 1, wherein the swingarm is adapted to attach at opposing ends thereof to spaced apart floor tracks and attach to the plinth such that in operation the swingarm is configured to deflect and move away from the plinth in response to floor deformation without deforming the plinth.

3. The seat mounting assembly according to claim 1, wherein the swingarm engages the plinth at a forward end of the plinth and the clevis sub-assemblies engage the plinth at rear corners of the plinth.

4. The seat mounting assembly according to claim 1, wherein each of the first and second clevis sub-assemblies comprise a clevis pivotally connected to a track fitting.

5. The seat mounting assembly according to claim 1, wherein the plinth is mounted on the swingarm centrally along the length of the swingarm such that each end of the swingarm is able to deflect downward away from the plinth.

6. The seat mounting assembly according to claim 1, wherein the plinth slides into locking engagement with the swingarm to allow vertical movement together and prevent vertical movement therebetween in an engaged position.

7. The seat mounting assembly according to claim 1, wherein the swingarm is pivotally connected at opposing ends thereof to track fittings.

8. The seat mounting assembly according to claim 1, further comprising a privacy shell mounted on the plinth.

9. The seat mounting assembly according to claim 8, wherein attachment points for mounting the seat and the privacy shell to the plinth are concealed from view from above.

10. An assembly adapted to mount a suite-style seat supported on a plinth to spaced-apart floor tracks to isolate the plinth from floor deformation, the assembly comprising:
  a swingarm adapted to attach to spaced-apart floor tracks and engaging the plinth such that the swingarm deflects away from the plinth in response to floor deformation; and
  clevis sub-assemblies spaced apart from the swingarm and from each other adapted to attach the plinth to spaced-apart floor tracks, each of the clevis sub-assemblies comprising a clevis pivotally connected to a track fitting, wherein each clevis sub-assembly is received within a corresponding opening through the plinth that narrows in a direction of a rear of the plinth such that each clevis sub-assembly slides into locking engagement with the plinth to prevent vertical movement therebetween in an engaged position;

wherein the swingarm engages the plinth at a forward end of the plinth and the clevis sub-assemblies engage the plinth at rear corners of the plinth.

11. The assembly according to claim 10, wherein the swingarm is adapted to attach at opposing ends thereof to spaced apart floor tracks and to the plinth such that in operation the swingarm is configured to deflect and move away from the plinth in response to floor deformation without deforming the plinth.

12. The assembly according to claim 10, wherein the swingarm is adapted to mount transverse to spaced-apart floor tracks.

13. The assembly according to claim 10, wherein the plinth is mounted on the swingarm centrally along the length of the swingarm such that each end of the swingarm is able to deflect downward away from the plinth, and wherein the plinth slides into locking engagement with the swingarm to allow vertical movement together and prevent vertical movement therebetween in an engaged position.

14. The assembly according to claim 10, wherein the swingarm is pivotally connected at opposing ends thereof to track fittings.

15. The assembly according to claim 10, wherein the suite-style seat includes at least a passenger seat and a privacy shell attached to the plinth.

16. The assembly according to claim 15, wherein attachment points for mounting the seat and the privacy shell to the plinth are concealed from view from above.

\* \* \* \* \*